(12) United States Patent
Chigira

(10) Patent No.: US 6,914,583 B1
(45) Date of Patent: Jul. 5, 2005

(54) HEAD-MOUNTED DISPLAYED APPARATUS

(75) Inventor: Tatsuo Chigira, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/499,951

(22) Filed: Feb. 8, 2000

(30) Foreign Application Priority Data

Feb. 12, 1999 (JP) ............................................. 11-034954

(51) Int. Cl.[7] .................................................. G09G 5/00
(52) U.S. Cl. ............................................. 345/7; 345/8
(58) Field of Search ........................ 345/7, 8; 359/630; 348/115; 351/158; 381/370

(56) References Cited

U.S. PATENT DOCUMENTS

| 4,534,628 A | * | 8/1985 | Morel | 351/153 |
| 4,993,065 A | * | 2/1991 | Chiou | 379/430 |
| 5,608,808 A | * | 3/1997 | da Silva | 381/370 |
| 5,815,126 A | * | 9/1998 | Fan et al. | 345/8 |
| 5,880,773 A | * | 3/1999 | Suzuki | 348/115 |
| 5,949,388 A | * | 9/1999 | Atsumi et al. | 345/8 |
| 5,986,813 A | * | 11/1999 | Saikawa et al. | 359/630 |
| 6,034,653 A | * | 3/2000 | Robertson et al. | 345/8 |
| 6,157,291 A | * | 12/2000 | Kuenster et al. | 345/8 |
| 6,181,304 B1 | * | 1/2001 | Robinson et al. | 345/8 |
| 6,330,121 B1 | * | 12/2001 | Kobayashi et al. | 359/831 |
| 6,441,978 B1 | * | 8/2002 | Kobayashi et al. | 359/834 |

\* cited by examiner

Primary Examiner—Xiao Wu
Assistant Examiner—Kevin M. Nguyen
(74) Attorney, Agent, or Firm—Cowan, Liebowitz & Latman, P.C.

(57) ABSTRACT

A head-mounted display apparatus includes a front frame on which a display part is mounted and right and left side frames which are connected to the two end parts of the front frame by hinge parts in a foldable manner. An earphone-and-cable fixing part and an earphone fixing part are provided respectively on the lower sides of the right and left side frames. The earphone-and-cable fixing part has its end surface formed in a "3" like shape to allow a cable and the stem part of an earphone to be lightly inserted there. The earphone fixing part has its end surface formed in a "C" like shape to allow an earphone to be lightly inserted there. Elastic members provided at the right and left side frames are arranged to have their fore ends not touching right and left observation windows provided in the body of the display part in a state obtained with the side frames folded on the inner side of the front frame.

8 Claims, 3 Drawing Sheets

HEAD-MOUNTED DISPLAYED APPARATUS

BACKGROUND OF THE INVENTION

1. Field of the Invention

The present invention relates to a head-mounted display apparatus arranged to be mountable on the head of a user to enable the user to observe a video image.

2. Description of Related Art

Visual display apparatuses called the head-mounted display apparatus arranged to enable the user to see a video image, or an image from a personal computer, on the image plane of a display device mounted on the head of the user have been disclosed, for example, in Japanese Laid-Open Patent Applications No. HEI 7-84210, No. HEI 7-181422, No. HEI 7-333547, etc.

With a head-mounted display apparatus mounted on the head of the user, the user can satisfactorily enjoy viewing video images or the like at any place without disturbing surroundings. The head-mounted display apparatus, therefore, must be easy to mount, light in weight, readily mountable and demountable and excel in portability. The known head-mounted display apparatuses are briefly described as follows.

(1) A head-mounted display apparatus disclosed in Japanese Laid-Open Patent Application No. HEI 7-84210 is in a shape having the rear portion of its mount part cut away. The head-mounted display apparatus is arranged to be mounted from the front of the head of the user in a readily demountable manner, giving the user a jaunty feeling of mounting the head-mounted display apparatus without touching the rear part of the head, and lightly pressing the head with a pressing holding member which is made of an elastic material such as metal or plastic.

(2) A head-mounted display apparatus disclosed in Japanese Laid-Open Patent Application No. HEI 7-181422 has its mount part formed to encompass the head of the user. The head-mounted display apparatus is arranged to be secured to the head of the user with the mount part being urged toward the two sides of the head of the user.

(3) A video image display apparatus disclosed in Japanese Laid-Open Patent Application No. HEI 7-333547 has a display part mounted on a mount frame. The mount frame is provided with a movable frame. The video image display apparatus is arranged to be fixed to the head of the user by urging the movable frame toward the head.

(4) In a head-mounted display apparatus of the head encompassing type, which has been marketed during recent years, an earphone-cable stowing mechanism which is disposed inside of the mount part is provided for the purpose of passing earphone cables through the inside of the mount part.

(5) In another head-mounted display apparatus, which has also been recently marketed, temples extending from a nose-touching part like spectacles are provided, and earphones are stowable at the fore ends of the temples.

However, the above conventional head-mounted display apparatuses have problems, as described below, and the solution of the problems has been desired.

The head-mounted display apparatus mentioned in the above Para. (1) can be easily mounted without any disagreeable feeling in the rear part of the head of the user. However, the pressing holding member is provided with an adjusting mechanism for adjustment of a pressing force. This adjusting mechanism increases the weight of the apparatus to degrade the light feeling of mounting. Further, the partly-cutaway head-encompassing shape of the frame causes the size of the apparatus to increase. The increased size of the apparatus degrades its portability, which is important for enabling the user to enjoy viewing a video image at any desired places.

The apparatus is secured to the head by pressing the head with the pressing holding member, which is made of an elastic material such as metal, plastic or the like. In a case where a plastic or the like is used, the pressing holding member is caused to creep to loosen by the continuous use over a long period of time and comes to necessitate adjustment of its elastic force. However, it tends to eventually become impossible to obtain a necessary elastic force by adjustment. In a case where a metal material is used as the elastic material, when the pressing holding member is spread for mounting the apparatus on the head, lack of design consideration as to properties and sectional shape of the material tends to incur a permanent set of fatigue with its internal stress coming to exceed the limit of elasticity. The use of a metal material thus also necessitates the adjustment of the elastic force, which might eventually become impossible.

In the case of the head-mounted display apparatus mentioned in the above Para. (2), a display part is fixed to the head of the user with a headband-like mount part. It takes time to correctly mount the display part with the mount part. The display part is relatively heavy and requires use of a relatively strong force in fixing the display part to the head of the user. The use of the relatively strong force not only causes the user to feel some pressure but also leaves some trace of mounting to the hair of the head of the user.

The video image display apparatus mentioned in the above Para. (3) is easily mountable as it is arranged to be mounted from the front of the face of the user and does not give any local pushed feeling as it does not press the head over the whole circumference thereof. However, the movable frame is arranged to be urged toward the head. A reaction to this urging force is received by the mount frame. The mount frame, therefore, must be arranged to have a sufficient rigidity against the reaction. As a result, the weight of the apparatus increases to impair the feeling of having the apparatus mounted on the head of the user.

The head-mounted display apparatus mentioned in the above Para. (4) has the earphone cables passed through the inside of its mount part. The mount part must have a larger thickness for this purpose. Besides, the earphone-cable stowing mechanism provided for the earphone cables also increases the weight of the apparatus. The arrangement is impedimental both to a jaunty appearance and to reduction in actual weight.

The head-mounted display apparatus mentioned in the above Para. (5) is arranged to have the weight of the apparatus received by the nose of the user, which is sensitive. Therefore, the use of the apparatus over a long period of time gives a disagreeable feeling to the user. Another problem with the apparatus lies in that, while earphones are provided with ear pads in general, the apparatus is arranged such that, in stowing the earphone at the fore end part of the temple, the peripheral portion of a part of the earphone to be inserted into the ear is inserted into the fore end stowing part of the temple. The arrangement, therefore, tends to damage the ear pads.

BRIEF SUMMARY OF THE INVENTION

The invention is directed to the solution of the problems of the prior art described in the foregoing. It is, therefore, an object of the invention to provide a head-mounted display apparatus which is arranged to prevent earphone cables from entangling, to be light in weight, to be easily mountable and to excel in portability.

To attain the above object, in accordance with an aspect of the invention, there is provided a head-mounted display apparatus, which comprises a front frame on which a display part is mounted through a holding member in a stowable manner, the display part being rotatable in forward and reverse directions, side frames which are connected respectively to two end parts of the front frame by hinge parts in a state of being movable to inner stowed positions by turning the hinge parts, the head-mounted display apparatus being capable of being mounted and held on the head of a user with an elastic force generated by spreading the side frames, and earphone holding members arranged on the side frames to hold earphones.

It is another object of the invention to improve the operability of a head-mounted display apparatus.

To attain the above object, in accordance with another aspect of the invention, there is provided a head-mounted display apparatus, which comprises a front frame on which a display part is mounted, right and left side frames which are connected respectively to two end parts of the front frame by hinge parts in a foldable manner, a mount pad disposed in a position of the front frame opposite to the forehead of a user, and elastic members provided in parts of the right and left side frames located opposite to the temple parts of the user, wherein the mount pad is arranged to be urged toward the forehead of the user by elastic forces of the right and left side frames generated toward the head of the user, and the elastic members are arranged to be located on the outside of the display part in a state obtained when the right and left side frames are folded with respect to the front frame.

These and other objects and features of the invention will become apparent from the following detailed description of a preferred embodiment thereof taken in connection with the accompanying drawings.

DETAILED DESCRIPTION OF THE INVENTION

Hereinafter, a preferred embodiment of the invention will be described in detail with reference to the drawings.

Figure 1:
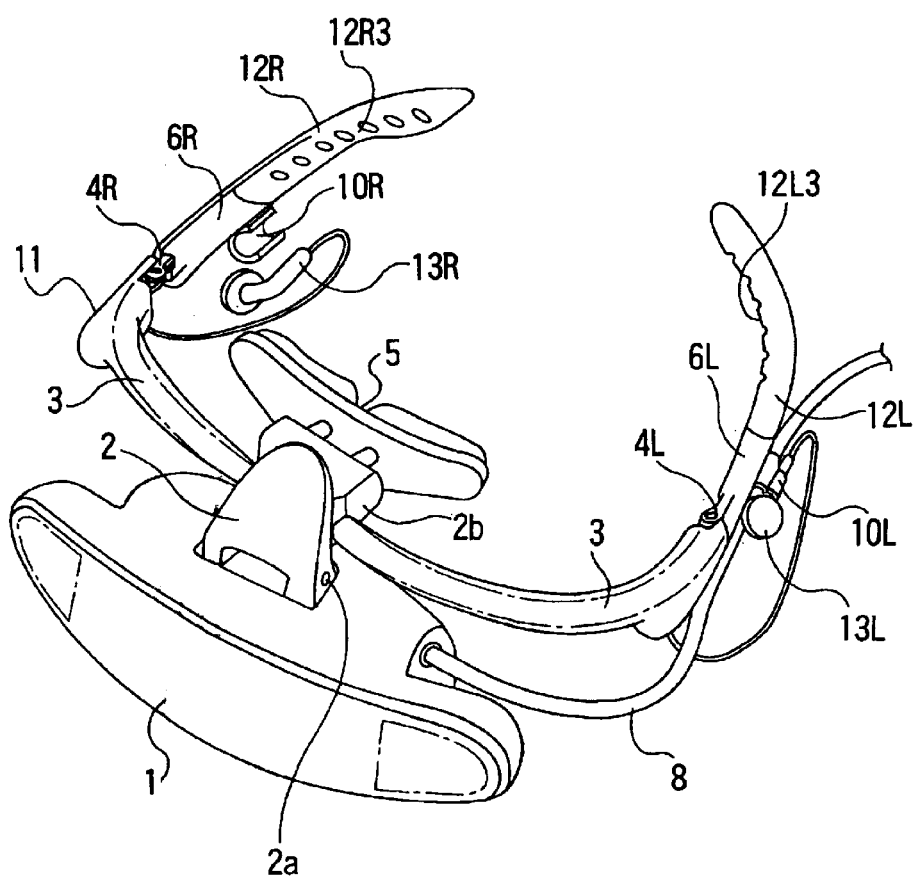
FIG. 1 is a perspective view showing the appearance of a head-mounted display apparatus according to an embodiment of the invention.

FIG. 1 is a perspective view showing the appearance of a head-mounted display apparatus according to the embodiment of the invention.

Referring to FIG. 1, the head-mounted display apparatus has a display part body 1 mounted on a front frame 3 through a holding member 2. Hinge parts 4L and 4R are mounted on the two end parts of the front frame 3. Side frames 6L and 6R are connected to the front frame 3 through the hinge parts 4L and 4R and are arranged to be foldable inward.

The display part body 1 contains a back light part, a liquid crystal panel, a display circuit and an optical member. The display part body 1 is pivotally supported by a rotary shaft 2a of the holding member 2 which is mounted on a middle part of the front frame 3 with screws. The display part body 1 is thus arranged to be swingable back and forth while retaining a certain amount of a frictional force. The holding member 2 is made of plastic, titanium, or the like. A front mount pad 5 is pivotally supported by the rotary shaft 2b of the holding member 2 in a vertically swingable state.

The front frame 3 is formed either with a metal bar, a metal pipe or a metal plate made of titanium or the like, which is coated with plastic and is bent into a shape of extending approximately along the forehead of the user. The hinge parts 4L and 4R are attached to the two end parts of the front frame 3 by brazing or caulking respectively at their end parts. To other ends of the hinge parts 4L and 4R are attached the side frames 6L and 6R. The front frame 3 and the side frames 6L and 6R are thus connected by the hinge parts 4L and 4R.

Each of the side frames 6L and 6R is formed by bending and coating, with plastic, a core member which is either a metal bar, pipe or plate made of titanium, a titanium alloy or a super elastic alloy. The side frames 6L and 6R are thus formed in a shape which is curved inward, and have elasticity in the direction of curvature. Further, the side frames 6L and 6R are pivotally supported by the hinge parts 4L and 4R to be swingable toward the head of the user within a predetermined angle range. Elastic members 12L and 12R which have core members inserted therein are attached to the rear end parts of the side frames 6L and 6R. The elastic members 12L and 12R are made of an elastomer or a rubber material.

The hinge parts 4L and 4R are arranged to have the side frames 6L and 6R located on lines extending from the front frame 3 and to have the end surfaces of the front frame 3 abut respectively on the end surfaces of the side frames 6L and 6R. By the hinge parts 4L and 4R, the side frames 6L and 6R are allowed to be folded inward but are prevented from swinging outward with respect to the lines extending from the front frame 3.

The side frames 6L and 6R are in such a shape that makes them softer and have a higher elasticity than the front frame 3. More specifically, the shape of the side frames 6L and 6R is such that the height of them obtained at their parts where they are attached to the hinge parts 4L and 4R gradually becomes lower and their thickness also gradually decreases accordingly as they extend rearward from the hinge parts 4L and 4R.

Further, an earphone-and-cable fixing part 10L and an earphone fixing part 10R are disposed respectively on the lower sides of the side frames 6L and 6R. The earphone-and-cable fixing part 10L has its end surface formed in a "3" like shape to allow a cable 8 and the stem part of an earphone 13L to be lightly inserted therein. Then, the earphone 13L and the cable 8 coming from a video tape deck, a personal computer or the like which is connected to the display part body 1 are fixed to the earphone-and-cable fixing part 10L. The earphone fixing part 10R has its end surface formed in a "C" like shape to allow the stem part of an earphone 13R to be lightly inserted therein.

Figure 2A:
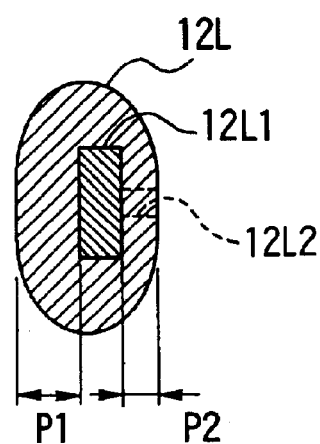
FIGS. 2(A) and 2(B) show the shape of an elastic member 12L.
Figure 2B:
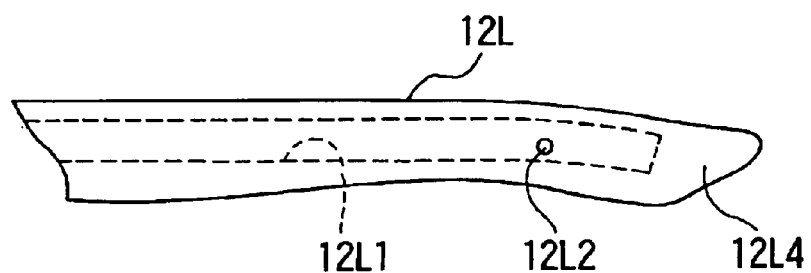

FIGS. 2(A) and 2(B) show the shape of the elastic member 12L. FIG. 2(A) is a sectional view of the elastic member 12L. FIG. 2(B) shows one side of the elastic member 12L on which the elastic member 12L does not abut on the head of the user. The elastic members 12R and 12L are formed in symmetrical shapes. The sides of the elastic members 12R and 12L on which the elastic members 12L and 12R abut on the head of the user are formed to have irregular parts (recess and projection parts) 12L3 and 12R3, as shown in FIG. 1. When the head-mounted display apparatus is mounted on the head of the user, the head-mounted display apparatus can be stably set there by virtue of the irregular surfaces 12L3 and 12R3.

Further, small holes 12L2 and 12R2 are formed in parts on the other sides of the elastic member 12L and 12R on which the elastic members 12L and 12R does not abut on the head of the user. Core members are longitudinally inserted in the middle parts of the elastic members 12L and 12R and arranged in such a way as to have the spring forces of these core members applied to the head when the head-mounted display apparatus is mounted on the head of the user. The thickness of the elastic members 12L and 12R is preferably arranged to be thicker on the inner side of the core members (on the side of the head) for avoiding concentration of a pressing force on the head by dispersing the pressing force and to be as thin as possible on the outer side of the core members for reduction of weight of the head-mounted display apparatus.

However, in forming each of the elastic members 12R and 12L by molding with a mold, the plastic which melts first convergingly flows toward the inner side where the member is thicker. The convergent flow of resin tends to cause the mold which longitudinally forms a middle long hole 12L1 of the elastic member 12L to bend. Therefore, it is difficult to adequately make the outer side thickness of the elastic members 12L and 12R thin, i.e., P1>P2, as shown in FIG. 2(A). To solve this problem, the mold which is used for forming the long hole 12L1 is arranged to be supported at the part where a small hole 12L2 is formed. This arrangement permits molding the elastic members to precisely have designed dimensions, so that they can be adequately arranged to be thin in thickness and light in weight.

Figure 3:
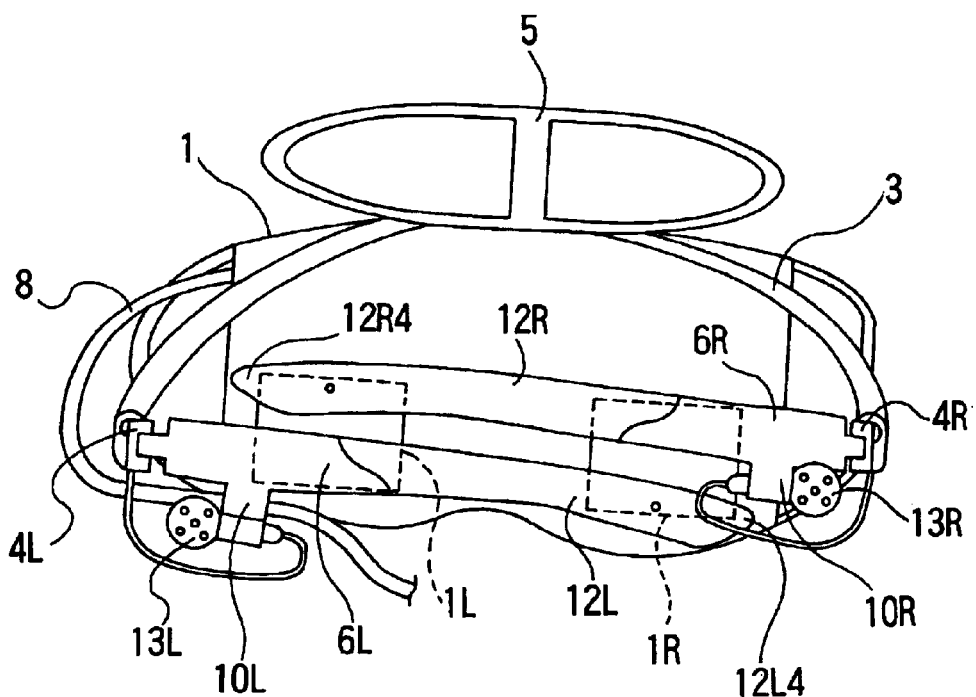
FIG. 3 is a perspective view showing the appearance of the head-mounted display apparatus in a state of having side frames 6L and 6R folded and stowed on the inner side of a front frame 3.

FIG. 3 shows the appearance of the head-mounted display apparatus in a state of having the side frames 6L and 6R folded and stowed on the inner side of the front frame 3. As shown in FIG. 3, the fore end parts 12L4 and 12R4 of the elastic members 12L and 12R are arranged such that, in their folded state, they do not touch observation windows 1L and 1R provided in the display part body 1.

With the head-mounted display apparatus arranged in the above-described manner, mounting the head-mounted display apparatus on the head of the user enables the user to view, for example, a video image coming from a video signal generating apparatus such as a video tape deck, through the observation windows 1L and 1R provided in the display part body 1.

In the case of the present embodiment disclosed, the earphone-and-cable fixing part 10L and the earphone fixing part 10R are provided respectively on the lower sides of the side frames 6L and 6R which are prepared by covering core members with plastic. In providing the earphone-and-cable fixing part 10L and the earphone fixing part 10R, these parts may be molded together with the elastic members 12L and 12R of the side frames 6L and 6R or may be formed as discrete members and attached to the elastic members either by bonding or with screws.

As has been described in the foregoing, a head-mounted display apparatus of the kind having a front frame on which a display part is mounted through a holding member in an easily stowable manner and side frames which are connected respectively to the two end parts of the front frame by hinge parts in a state of being easily movable to inner stowed positions by turning the hinge parts and arranged to allow the head-mounted display apparatus to be mounted and held on the head of the user with an elastic force generated by spreading the side frames is provided with earphone holding members which are arranged on the side frames to hold earphones. Accordingly, it is possible to provide a head-mounted display apparatus which is arranged to prevent earphone cables from entangling, to be light in weight, to be easily mountable and to excel in portability.

Each of the earphone holding members is composed of an elastic body fixed to the lower side of each side frame and is arranged to hold, with an elastic force, the stem part of the earphone inserted into the inner side of the elastic body. Therefore, the earphones can be easily held in position. For example, with the end face of the elastic body arranged to be in a "C" shape, the stem part of the earphone can be easily held without damaging the pad of the earphone.

The earphone holding member is arranged to hold also a cable which is connected to the display part. That arrangement effectively prevents the cable connected to the display part and an earphone cable from being entangled with each other. Further, the arrangement for holding the earphone with one and the same member prevents the weight of the head-mounted display apparatus from increasing.

When the display part and the side frames are stowed on the inner side of the front frame, the fore end parts of the side frames are located outside of the observation windows provided in the display part. The observation windows are, therefore, never damaged by the side frames when they are stowed.

Further, the side frames are formed by coating core members with elastic members. To hold a mold used for molding each of the elastic members having a long (longitudinal center) hole in which the core member is to be inserted, a small hole which communicates with the long core-member-inserting hole is formed on the side of the elastic member not abutting on the head of the user. The small hole to be used for holding the elastic-member molding mold is formed in a part on one side of the elastic member not abutting on the head of the user. The part in which the small hole is formed is used to support a part of the mold where the core-member-inserting long hole is formed and tends to elongate or deform. The arrangement permits the elastic members to be molded with precision and also allows reduction in weight. The use of the elastic members made of an elastomer or a rubber enables the user to have a soft touch on the head and also enables even a user having metal allergy to continuously use the head-mounted display apparatus over a long period of time without fear.

Further, the thickness of each of the elastic member is arranged to be thicker on one side of the core-member inserting hole on which the elastic member abuts on the head of the user than the other side of the core-member inserting hole. That arrangement effectively disperses the elastic pressing force on the head. Further, since the thickness on the side not abutting the head of the user is arranged to be thinner, the weight of the head-mounted display apparatus can be reduced.

What is claimed is:

1. A head-mounted display apparatus, comprising:
   a front frame on which a display part is mounted through a holding member in a stowable manner and a mount pad is disposed opposite to a forehead of a user, said display part being rotatable in forward and reverse directions; and side frames which are connected respectively to two end parts of said front frame by hinge parts in a state of being movable to inner stowed positions by turning the hinge parts, said head-mounted display apparatus being capable of being mounted and held on the forehead of the user by pressing the mount pad to the forehead of the user and pressing a back part of the uses head by an elasticity of said side frames, wherein each of said frames comprises an elastic member and a core member longitudinally inserted in the elastic member and the thickness of the elastic member relative to the core member is preferably arranged to be thicker on the inner side of the core member than on the outer side of the core member.

2. A head-mounted display apparatus according to claim 1, wherein one of said earphone holding members is arranged to further hold a cable connected to said display part.

3. A head-mounted display apparatus according to claim 1, wherein, when said display part and said side frames are stowed on an inner side of said front frame, a fore end part of each of said side frames is located outside of an observation window provided in said display part.

4. A head-mounted display apparatus according to claim 1, wherein each of said side frames is formed by covering a core member with an elastic member which is provided with an inserting hole for inserting said core member, and a hole communicating with said inserting hole is formed also in said elastic member, in a part on one side thereof not abutting an head of the user, for supporting a mold used in forming said elastic member by molding.

5. A head-mounted display apparatus according to claim 4, wherein said elastic member is formed to have a thickness thereof increased on one side of said inserting hole on which said elastic member abuts on the head of the user and decreased on the other side on which said elastic member does not abut on the head of the user.

6. A head-mounted display apparatus, comprising:

a front frame on which a display part is mounted;

right and left side frames which are connected respectively to two end parts of said front frame by hinge parts in a foldable manner;

elastic members provided in parts of said right and left side frames located opposite to the temple parts of a user and covering core members of said right and left side frames respectively;

a mount pad disposed in a position of said front frame opposite to the forehead of the user and arranged to be urged toward the forehead of the user by elastic forces of said right and left side frames generated toward a back part of the head of the user; and wherein a thickness of each of said elastic member relative to the member is preferably arranged to be thicker on the inner side of the core member than on the outer side of the core member.

7. A head mounted display apparatus according to claim 6, wherein each of said right and left side frames has a thickness thereof thicker on an inner side thereof which abuts on tile head of the user than on an outer side thereof, and a hole is formed in a part on the outer side of each of said right and left side frames.

8. A head-mounted display apparatus according to claim 6, wherein a cable holding part is formed at one of said right and left side frames.

* * * * *

UNITED STATES PATENT AND TRADEMARK OFFICE
CERTIFICATE OF CORRECTION

PATENT NO. : 6,914,583 B1
DATED : July 5, 2005
INVENTOR(S) : Tatsuo Chigira

It is certified that error appears in the above-identified patent and that said Letters Patent is hereby corrected as shown below:

Column 7,
Line 30, delete "an the head" and insert -- on the head --.

Signed and Sealed this

Twenty-first Day of March, 2006

JON W. DUDAS
*Director of the United States Patent and Trademark Office*